United States Patent Office 2,854,490
Patented Sept. 30, 1958

2,854,490

THERMAL DECOMPOSITION OF TRIFLUORO-ETHYLENE POLYMERS

Edgar Fischer and Hans-Helmut Frey, Frankfurt am Main, Germany, assignors to Farbwerke Hoechst Aktiengesellschaft vormals Meister Lucius & Brüning, Frankfurt am Main, Germany, a corporation of Germany No Drawing. Application August 1, 1955
Serial No. 525,783

Claims priority, application Germany July 30, 1954

6 Claims. (Cl. 260—653)

This invention relates to the production of fluorochlorocarbon oils and waxes which are useful as lubricants and as plasticizers for fluorochlorocarbon plastics or resins. There are various processes known by which fluorochlorocarbon oils or waxes may be obtained by the decomposition of relatively high molecular weight plastics which consist of the elements carbon, fluorine and chlorine.

Thus, one can carry out a decomposition by heating the polymers of trifluorochloroethylene to temperatures from 400 to 650° C. The disadvantage of this process is that, as a result of the high temperatures applied, low molecular weight compounds result, consisting largely of monomeric trifluorochloroethylene. This process, which can be operated with or without vacuum, is, therefore, little suited for a technical preparation of fluorochlorocarbon oils.

It has also already been suggested to decompose the high molecular weight starting materials at temperatures of 50—350° C. in the presence of powdered metals or mixtures of metals, metal oxides, or inorganic metal salts, particularly halides whereupon the cracked products (oils and waxes) are drawn off in the vacuum.

Now it has been discovered that one can prepare liquid oil or wax-like low molecular weight compounds containing carbon, fluorine, and chlorine by thermal decomposition of polymers or copolymers of trifluorochloroethylene by carrying out the decomposition in a current of steam at temperatures of 100 to 500° C., preferably at 150 to 350° C. The steam is fed into the cracking zone at a rate which may vary from 0.05 to 50 parts by weight of steam per hours (about 760 Torr.) per 1 part by weight of initial polymer, and preferably from 0.1 to 10 parts by weight.

One can work in the absence of cracking catalysts, but the presence of cracking catalysts, such as sulfates of copper, cobalt and nickel, is advantageous.

There is a technical advantage to the present process, which would not ordinarily be expected, in that by varying the amount and the temperature of the decomposing steam it is possible, in a simple manner, to direct the process toward preferred fractions. One finds the following relation:

The greater the amount of steam at a given temperature, the higher is the molecular weight of the cracked products, and the higher the steam temperature with a given amount of steam, the lower the molecular weight of the cracked products. The process is, for example, applicable to the polymers and copolymers of trifluorochloroethylene. The copolymer components may be, e. g., tetrafluoroethylene, vinylidene fluoride, vinyl chloride, vinylidene chloride, and acrylic acid, and their derivatives.

The process according to this invention represents substantial progress in contrast with the known process. As to apparatus, it allows the process to be carried out continuously in a much simpler manner (since it can be performed not in vacuum, but at normal pressure). No special apparatus is required for the removal of the highly corrosive cracking byproducts (free halogens). Furthermore, the amount of heat supplied by the superheated steam permits a substantial increase of the throughput in contrast with a process operating in vacuum.

It is, in addition, very surprising that the steam causes no hydrolysis of halogens with formation of compounds containing oxygen under the energetic conditions of the present process. The products obtained by this invention are suitable for a subsequent, chemical conversion, particularly fluorination or oxidation.

*Example 1*

1000 parts by weight of polytrifluorochlorethylene with the NST-value 300 are charged, at internal temperature 300° C., into a stainless steel distillation vessel which is supplied with a stirrer and steam inlet tube and then superheated steam at 350° C. is introduced at the rate of 1.2 kg. per hour. The mixture which passes over is collected by condensation in a receiver, in which 728 parts by weight of a viscous, thin yellow oil of density $d_{(20)}=1.94$ separates as the higher-density layer. The aqueous layer of 7340 parts by weight reacts strongly acid and contains free hydrogen halide; titration value 82 cc. (1 M NaOH) liter. No residue is found in the distillation vessel at the end of the reaction. Analysis of the oil: C, 19.9%; gram molecular weight 850; hydrogenation iodine number 112; F, 48.5%; Cl, 30.3%.

*Example 2*

In an apparatus according to Example 1 at an internal temperature of 300–310° C., 1000 parts by weight of polytrifluoroethylene with an NST-value of 300 are brought in the presence of 100 parts by weight of anhydrous copper sulfate into a current of 2 kg. per hour of superheated steam at 300–310° C. There are obtained 895 parts by weight of fluorochlorocarbon oils of density $d_{(20)}=1.86$ and 1535 parts by weight of an aqueous layer. In this procedure only one-eighth of the time is used which is required in a process according to Example 1, in order to obtain the same amount of oil. At the end of the reaction 100 parts by weight of unchanged copper sulfate are found in the reaction vessel. Analysis of the oil: C, 20.7%; Cl, 30.4%; F, 48.4%; gram molecular weight, 613; hydrogenation iodine number, 131. Analysis by fractional distillation, carried out at 22 mm. pressure: at 100° C., 14% passed over, 160° C.=36%, 200° C.=60%, 240° C.=85%.

We claim:

1. Process for the preparation of low molecular weight oils and waxes containing carbon, fluorine and chlorine by thermal decomposition of a polymer of the group consisting of the homopolymers and copolymers of trifluorochloroethylene wherein the comonomer is a monoolefin having not more than three carbon atoms and having at least one substituent selected from the group consisting of chlorine, fluorine and a carboxyl radical, which process is characterized in that the decomposition is undertaken in the presence of steam at temperatures of 100 to 500° C.

2. Process according to claim 1, wherein the temperatures range from 150° C. to 350° C.

3. Process according to claim 1, wherein the decomposition takes place in the presence of a metal sulfate cracking catalyst.

4. Process for the preparation of low molecular weight oils and waxes containing carbon, fluorine and chlorine by thermal decomposition of a polymer of the group consisting of the homopolymers and copolymers of trifluorochloroethylene wherein the comonomer is a monoolefin having not more than three carbon atoms and having at least one substituent selected from the group consisting of chlorine, fluorine and carboxyl radical in which steam at a temperature of 150° C. to 500° C. is passed through a mass of the polymer at a rate of 0.05 to 50 parts by weight of steam per hour (about 760 Torr.) per 1 part of weight of initial polymer, and wherein steam and product vapors are condensed.

5. Process according to claim 4, wherein the temperatures range from 150° C. to 350° C.

6. Process according to claim 4, wherein the decomposition takes place in the presence of a cracking catalyst selected from the group consisting of sulfates of cobalt, copper and nickel and mixtures thereof.

References Cited in the file of this patent
UNITED STATES PATENTS

| | | |
|---|---|---|
| 1,374,858 | McComb | Apr. 12, 1921 |
| 2,394,581 | Benning et al. | Feb. 12, 1946 |
| 2,420,222 | Benning et al. | May 6, 1947 |
| 2,436,069 | Joyce | Feb. 17, 1948 |
| 2,543,530 | Kropa et al. | Feb. 27, 1951 |
| 2,664,449 | Miller | Dec. 29, 1953 |